US012686074B2

(12) United States Patent
Chen et al.

(10) Patent No.: US 12,686,074 B2
(45) Date of Patent: Jul. 21, 2026

(54) QUICK-PRESSING FIXTURE FOR FRICTION STIR SPOT WELDING, AND USE METHOD THEREOF

(71) Applicant: Nanchang Hangkong University, Nanchang City (CN)

(72) Inventors: Yuhua Chen, Nanchang City (CN); Min Zheng, Nanchang City (CN); Shanlin Wang, Nanchang City (CN); Limeng Yin, Nanchang City (CN); Jinyang Hu, Nanchang City (CN); Qing Jiang, Nanchang City (CN); Chao Wan, Nanchang City (CN); Jie Li, Nanchang City (CN); Tao Jiang, Nanchang City (CN)

(73) Assignee: Nanchang Hangkong University, Nanchang City (CN)

( * ) Notice: Subject to any disclaimer, the term of this patent is extended or adjusted under 35 U.S.C. 154(b) by 0 days.

(21) Appl. No.: 19/383,540

(22) Filed: Nov. 7, 2025

(65) Prior Publication Data

US 2026/0200009 A1 Jul. 16, 2026

(30) Foreign Application Priority Data

Jan. 14, 2025 (CN) .......................... 202510056818.3

(51) Int. Cl.
*B23K 20/12* (2006.01)

(52) U.S. Cl.
CPC ........ *B23K 20/126* (2013.01); *B23K 20/1265* (2013.01)

(58) Field of Classification Search
CPC .............. B23K 20/126; B23K 20/1265; B23K 20/122–1295; B23K 37/04–0538
(Continued)

(56) References Cited

U.S. PATENT DOCUMENTS

2009/0308913 A1* 12/2009 Hall ................... B23K 20/1265
228/112.1
2011/0099808 A1* 5/2011 Imamura ............ B23K 20/1265
29/761
(Continued)

FOREIGN PATENT DOCUMENTS

CN 101767251 B * 3/2013 ............. B23K 20/12
CN 103394803 B 11/2013
(Continued)

OTHER PUBLICATIONS

First Office Action issued in CN202510056818.3 on Mar. 7, 2025, and English translation thereof.
(Continued)

*Primary Examiner* — Kiley S Stoner
(74) *Attorney, Agent, or Firm* — ARC IP Law, PC; Joseph J. Mayo

(57) ABSTRACT

A quick-pressing fixture for friction stir spot welding and a use method thereof relate to the technical field of friction stir spot welding; the quick-pressing fixture includes a stationary working box and a welding platform integrally connected at the top of the working box, and further includes a welding base, a welding press block, a pneumatic quick-pressing mechanism and a limiting mechanism, where the limiting mechanism can clamp different sizes of welding materials and effectively improve the practicality of the quick-pressing fixture, and the limiting mechanism can also tighten a weldment and prevent the weldment from rotating during a welding process; the pneumatic quick-pressing mechanism is responsible for applying a predetermined pressing force in a vertical direction to the weldment in order to ensure the stability of the weldment in the welding process.

16 Claims, 12 Drawing Sheets

(58) Field of Classification Search
USPC ............ 228/112.1–114.5, 2.1–2.3, 47.1–49.6
See application file for complete search history.

(56)                    References Cited

U.S. PATENT DOCUMENTS

| | | | | |
|---|---|---|---|---|
| 2014/0144972 | A1 * | 5/2014 | Takasugi ............ | B23K 20/1255 228/2.1 |
| 2017/0120373 | A1 * | 5/2017 | Edwards ............ | B23K 20/1255 |
| 2021/0331421 | A1 * | 10/2021 | Okada .................. | B23K 20/122 |
| 2022/0048131 | A1 * | 2/2022 | Wenning ........... | B23K 20/1245 |
| 2022/0362889 | A1 * | 11/2022 | Ohashi ............... | B23K 20/2333 |
| 2024/0293889 | A1 * | 9/2024 | Miyake ............... | B23K 20/123 |

FOREIGN PATENT DOCUMENTS

| | | | | | |
|---|---|---|---|---|---|
| CN | 103909341 | A | * | 7/2014 | ........... B23K 20/126 |
| CN | 105583515 | A | * | 5/2016 | ........... B23K 20/126 |
| CN | 106041291 | A | * | 10/2016 | ......... B23K 20/1245 |
| CN | 106624344 | A | * | 5/2017 | .......... B23K 20/127 |
| CN | 108817648 | A | * | 11/2018 | ............. B23K 20/26 |
| CN | 111250862 | A | * | 6/2020 | ............. B23K 20/26 |
| CN | 112975247 | A | * | 6/2021 | .......... B23K 20/126 |
| CN | 113953648 | A | * | 1/2022 | ......... B23K 20/1245 |
| CN | 116100138 | A | * | 5/2023 | ......... B23K 20/1265 |
| CN | 119457400 | A | * | 2/2025 | ......... B23K 37/0435 |
| EP | 4269015 | B1 | * | 1/2026 | ......... B23K 20/1245 |
| KR | 102086914 | B1 | * | 4/2020 | ............. B23K 28/02 |
| WO | WO-2011157893 | A1 | * | 12/2011 | ......... B23K 20/1265 |

OTHER PUBLICATIONS

Notification to Grant Patent Rights issued in CN202510056818.3 on May 1, 2025, and English translation thereof.

* cited by examiner

QUICK-PRESSING FIXTURE FOR FRICTION STIR SPOT WELDING, AND USE METHOD THEREOF

CROSS-REFERENCE TO RELATED PRESENT DISCLOSURE

This patent application claims the benefit and priority of Chinese Patent Application No. 202510056818.3 filed with the China National Intellectual Property Administration on Jan. 14, 2025, the disclosure of which is incorporated by reference herein in its entirety as part of the application.

TECHNICAL FIELD

The present disclosure relates to the technical field of friction stir spot welding, and in particular to a quick-pressing fixture for friction stir spot welding and a use method thereof.

BACKGROUND

A quick-pressing fixture is a fixture special for a friction stir spot welding technology, which has main functions of fixing a workpiece to be welded, keeping a correct welding position and a welding angle and providing a necessary pressure and vibration to achieve an effect of friction stir spot welding.

As a novel solid-phase welding technology, the friction stir spot welding technology has attracted extensive attention thanks to unique advantages. This technology uses a rotary welding tool to perform stirring and friction on a material and generates heat to plasticize the material, and accordingly a firm joint is formed at a connecting interface. Compared with conventional fusion welding, the friction stir spot welding technology does not require metal melting. Therefore, a welding deformation is small, and the joint has excellent performance and is especially suitable for the connection of metal materials such as an aluminum alloy, and a magnesium alloy.

For example, a Chinese Patent CN103394803B discloses a friction stir spot welding fixture, which includes a first fixing seat for fixing a workpiece to be welded, a second fixing seat disposed opposite to the first fixing seat to fix another workpiece to be welded, and an accommodating space formed between the first fixing seat and the second fixing seat. The first fixing seat and the second fixing seat each include a base block, a support surface formed on an upper side of the base block to support the workpiece to be welded, and a plurality of press blocks disposed above the support surface to fix the workpiece to be welded. A plane where the support surface is located divides the accommodating space into a first accommodating cavity located on the upper side of the support surface to accommodate the workpiece to be welded, and a second accommodating cavity located below the support surface to selectively accommodate a welding base plate.

However, the above fixture also has some shortcomings during practical use:

1. First, a fixture in a conventional art requires manual operation, and accordingly it is difficult to align weld joints during welding; moreover, operation steps of tooling for clamping are more complicated, and the conventional fixture cannot allow the observation of a working trajectory of a stirring head used for spot welding during welding material machining, which is prone to resulting in undesired situations such as spot welding offset.

2. Second, the conventional fixture cannot ensure that each fixture applies the same clamping force to the welding material, which is thus prone to causing difficult alignment of weld joints, an excessively small clamping force will cause a displacement or vibration of the welding material in the welding process, resulting in poor contact of the welding materials, which leads to insufficient plasticization of a welding area and then causes defects such as incomplete penetration, and cold lapping; an excessively large clamping force causes an excessive deformation of the welding material, increasing a stress in the welding area and affecting the welding strength.

Therefore, it is still desirable to improve the conventional fixture in consideration of the perspectives stated above.

SUMMARY

In order to solve the above problems, the present disclosure provides a quick-pressing fixture for friction stir spot welding and a use method of use thereof, which use the following technical solution:

In a first aspect, the present disclosure provides a quick-pressing fixture for friction stir spot welding, which includes a stationary working box and a welding platform integrally connected at a top end of the working box; a welding base is provided with a positioning groove for precise placement of a welding material, an opening is formed in one side of the positioning groove, the welding platform is provided with a plurality of parallel T-shaped grooves for horizontal sliding of the welding base, the welding base is further provided with a guide groove integrally connected to the positioning groove, and a limiting slide plate is slidably connected in the guide groove of the welding base.

A welding press block abuts against the welding base and limits the downward pressing on the welding material located in the positioning groove of the welding base, and the welding press block is distributed movably.

The pneumatic quick-pressing mechanisms are configured to clamp the welding material; the pneumatic quick-pressing mechanisms are symmetrically disposed on two sides of an upper surface of the welding platform along a width direction of the welding platform.

The pneumatic quick-pressing mechanism comprises a support base, a pneumatic cylinder, an operating crank, a support frame, a press block and a first pressure sensor; the support based are symmetrically mounted at two sides of a top end of the welding platform along a length direction of the welding platform, the pneumatic cylinder is hinged to one side of the support base, an output end of the pneumatic cylinder obliquely extends outward, and the operating crank is hinged to the support base by means of the support frame; one side of the operating crank is hinged to the output end of the pneumatic cylinder each other, the other side of the operating crank is hinged to the press block each other, a bottom of the press block is provided with the first pressure sensor which monitors a pressure for pressing the welding press block in real time, and the press block and the first pressure sensor remain in a horizontal state at all times.

The press block is further provided with a suction mechanism, the suction mechanism comprises a suction machine, a wire and a trigger lever, the suction machines are disposed on two opposite sides of two press blocks, and a suction opening is formed in an end of the press block close to the suction machine.

The wire is mounted on a back side of the suction machine, the middle of the wire is provided with two metal trigger sheets, the two metal trigger sheets are symmetrically disposed in the press block in a height direction of the press block, the metal trigger sheet on one side is slidably disposed, the metal trigger sheet on another side abuts against an inner wall of the press block, the trigger lever abuts against the slidably disposed metal trigger sheet, and the trigger lever slidably penetrates the press block and extends toward the welding press block.

A linkage lever is further connected to one side of the trigger lever, an opening-closing door slidably mounted in the suction opening of the press block is disposed at an end of the linkage lever remote from the trigger lever, and a reset tension spring is connected between the opening-closing door and the press block.

Preferably, the middle of the welding press block is provided with a circular truncated cone through slot for a mixing head required for welding to move and perform sport welding in a height direction of the welding platform, and a V-shaped through groove for observing the entire welding process is further integrally formed at the circular truncated cone through slot of the welding press block.

Preferably, a limiting mechanism for controlling a movement of the limiting slide plate is further disposed on one side of the limiting slide plate on the welding base, and the limiting mechanism comprises a sliding bottom plate, a stepping motor, a coupler and a lead screw; the sliding bottom plate is slidably disposed on the T-shaped grooves of the welding platform, the stepping motor is slidably disposed on the sliding bottom plate, the sliding bottom plate is provided with a strip-shaped sliding groove for sliding of the stepping motor, the lead screw is mounted on an output end of the stepping motor by means of the coupler, and the lead screw extends toward the limiting slide plate.

Preferably, a second pressure sensor is mounted at an end of the limiting slide plate remote from the lead screw.

Preferably, a lead screw securing block is further disposed on the welding base, the lead screw is screwed and penetrates the lead screw securing block, one side of the lead screw extends toward the limiting slide plate on the welding base, and the lead screw securing block is assembled by means of bolts.

Preferably, a snap-in block is further integrally connected to an end of the lead screw close to the limiting slide plate, the snap-in block is inserted onto the limiting slide plate, the limiting slide plate is provided with a catch slot for the insertion of the snap-in block, the snap-in block and the limiting slide plate are jointly provided with a circular limiting hole, and a connecting bolt is disposed in the circular limiting hole.

Preferably, the welding base and the sliding bottom plate are disposed in the T-shaped grooves of the welding platform by means of bolts and nuts.

Preferably, a side of the support base close to the press block is provided with a movement groove for the rotation of the operating crank.

In a second aspect, the present disclosure further provides a method for using a quick-pressing fixture for friction stir spot welding. The use method of the quick-pressing fixture will be described as follows:

S1, placing the welding material: placing the welding material to be machined on the welding base, and controlling the limiting slide plate on the welding base to move in a direction where the welding material is located, until the limiting slide plate abuts against a side wall of the welding material;

S2, preliminarily clamping the welding material: after the welding material is pressed and limited by the limiting slide plate, and placing the welding press block on a surface of the welding material while the welding press block is located at the middle of the welding material;

S3, secondarily clamping the welding material: activating the pneumatic quick-pressing mechanism to press down the welding press block, such that the welding press block secondarily limits the welding material at the bottom of the welding press block; and S4, machining the welding material: after the welding material is clamped and limited, activating the mixing head to perform a spot welding operation on the welding material until the welding is completed, and finally taking out the welding material subjected to the spot welding after the welding is finished.

In summary, the present disclosure includes at least one of the following beneficial technical effects:

First, the present disclosure can clamp welding materials of different sizes and effectively improve the practicability of the fixture of the present disclosure by means of the limiting slide plate and the limiting mechanism, and the limiting mechanism is used for driving the limiting slide plate to move linearly along the guide groove in order to fasten the welding material and to prevent the rotation of the welding material in the welding process; the present disclosure further provides the press block and the pneumatic quick-pressing mechanism, and the pneumatic quick-pressing mechanism is responsible for applying a predetermined pressing force in a vertical direction to a weldment in order to ensure the stability of the weldment in the welding process.

Second, the present disclosure can achieve automatic clamping of the welding material by means of the cooperation of the pneumatic quick-pressing mechanism and the limiting mechanism, can greatly improve the efficiency of clamping the welding material compared with a conventional technology, and can effectively improve the stability of clamping the welding material by means of pressure monitoring of the first pressure sensor and the second pressure sensor.

Third, the welding fixture of the present disclosure is designed to improve the efficiency and quality of the welding operation and achieves rapid clamping and release of the weldment by simplifying a clamping and removing flow of the weldment, so that the thermal deformation of the weldment in the welding process is reduced, and the production efficiency is improved.

Fourth, the welding press block in the present disclosure has the unique V-shaped through groove, which is conducive to observing the welding process and monitoring a real-time welding temperature in cooperation with an external temperature measurement apparatus, so as to facilitate subsequent optimization of process parameters.

BRIEF DESCRIPTION OF THE DRAWINGS

The present disclosure will be further described below with reference to the accompanying drawings and embodiments.

Figure 1:
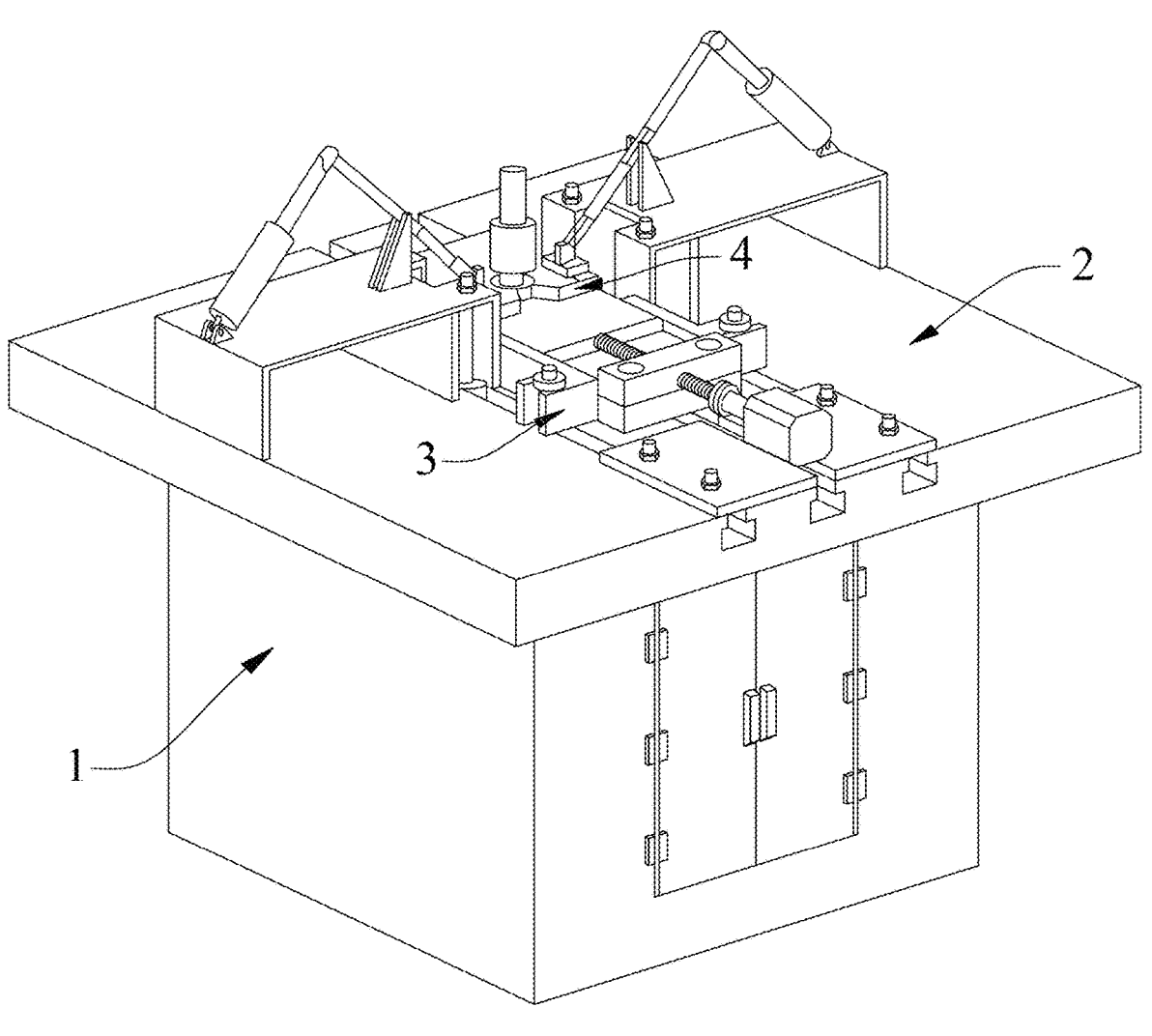
FIG. 1 is a schematic structural diagram of a main body of a quick-pressing fixture of the present disclosure.

List of reference numerals: A. welding material; B. rivet; C. stirring head; 1. working box; 2. welding platform; 3. welding base; 30. positioning groove; 20. T-shaped groove; 31. guide groove; 32. limiting slide plate; 4. welding press block; 5. pneumatic quick-pressing mechanism; 40. circular truncated cone through slot; 41. V-shaped through groove; 50. support base; 51. pneumatic cylinder; 52. operating crank; 53. support frame; 54. press block; 55. first pressure sensor; 6. limiting mechanism; 60. sliding bottom plate; 61. stepping motor; 62. coupler; 63. lead screw; 33. second pressure sensor; 64. lead screw securing block; 65. snap-in block; 66. catch slot; 67. circular limiting hole; 68. connecting bolt; 7. adjustment member; 70. adjustment plate; 71. connecting block; 72. adjustment screw; 8. suction mechanism; 80. suction machine; 81. wire; 82. trigger lever; 83. metal trigger sheet; 84. suction opening; 85. linkage lever; 86. reset tension spring; 87. opening-closing door.

DETAILED DESCRIPTION OF THE EMBODIMENTS

The present disclosure will be further described below in detail with reference to FIGS. 1-15.

With the continuous progress of modern industrial technologies, there is a growing demand for connecting technologies for high-strength and lightweight materials. Especially, the requirements for material connecting processes are higher in high-end manufacturing fields such as automobile manufacturing, aerospace and rail transportation. The connecting quality of these materials is directly related to the safety and reliability of products. Therefore, it is particularly important to develop efficient and high-quality connecting technologies.

As a novel solid-phase welding technology, a friction stir spot welding technology has attracted extensive attention thanks to unique advantages. This friction stir spot welding technology uses a rotary welding tool to perform stirring and friction on a material and generates heat to plasticize the material, and accordingly a firm joint is formed at a connecting interface. Compared with conventional fusion welding, the friction stir spot welding technology does not require metal melting. Therefore, a welding deformation is small, and the joint has excellent performance and is especially suitable for the connection of metal materials such as an aluminum alloy, and a magnesium alloy.

However, there are still some challenges in practical applications of the friction stir spot welding technology. The magnitude and uniformity of a clamping force on a final welding effect of a welding material A are also not ignorable, an excessively small clamping force may cause a displacement or vibration of the welding material A in a welding process, which results in poor contact between plates, then causes insufficient plasticization of a welding area and thus generates defects such as incomplete penetration, and cold lapping.

An excessively large clamping force to prevent the welding material A from rotating in the welding process may cause an excessive deformation of the welding material A, increase a stress of the welding area and lead to internal cracks and other defects of a welded joint, and may even damage the welding material A. A nonuniform clamping force may lead to nonuniform plastication of the welded area and stress concentration of the welded joint, which may shorten the fatigue life of the joint, cause instability in the welding process, and increase the risk of weld defects.

This situation requires that a welding fixture has sufficient rigidity and a uniform clamping force, and precise control to the clamping force and a welding position can ensure the repeatability of a welded sample. During the conventional friction stir spot welding, multiple sets of fixtures and bolts are required to secure the welding material A before welding, this process is not only time-consuming and laborious, but also has poor positioning accuracy and low welding efficiency. Moreover, it is difficult to ensure the stability and repeatability of a conventional fixture in the welding process, which limits wide applications of the friction stir spot welding technology in industrial production.

In view of the above problems, in order to obtain high-quality welded joints of friction stir spot welding, the present disclosure provides a novel quick-pressing fixture; the fixture is designed by considering the simplicity and convenience of operation, clamping stability, welding efficiency and repeatable welding, and achieves rapid and accurate clamping during welding and significantly and improves the manufacturability and production efficiency of the friction stir spot welding by adopting an innovative structural design and an intelligent control strategy.

Embodiment 1

Figure 2:
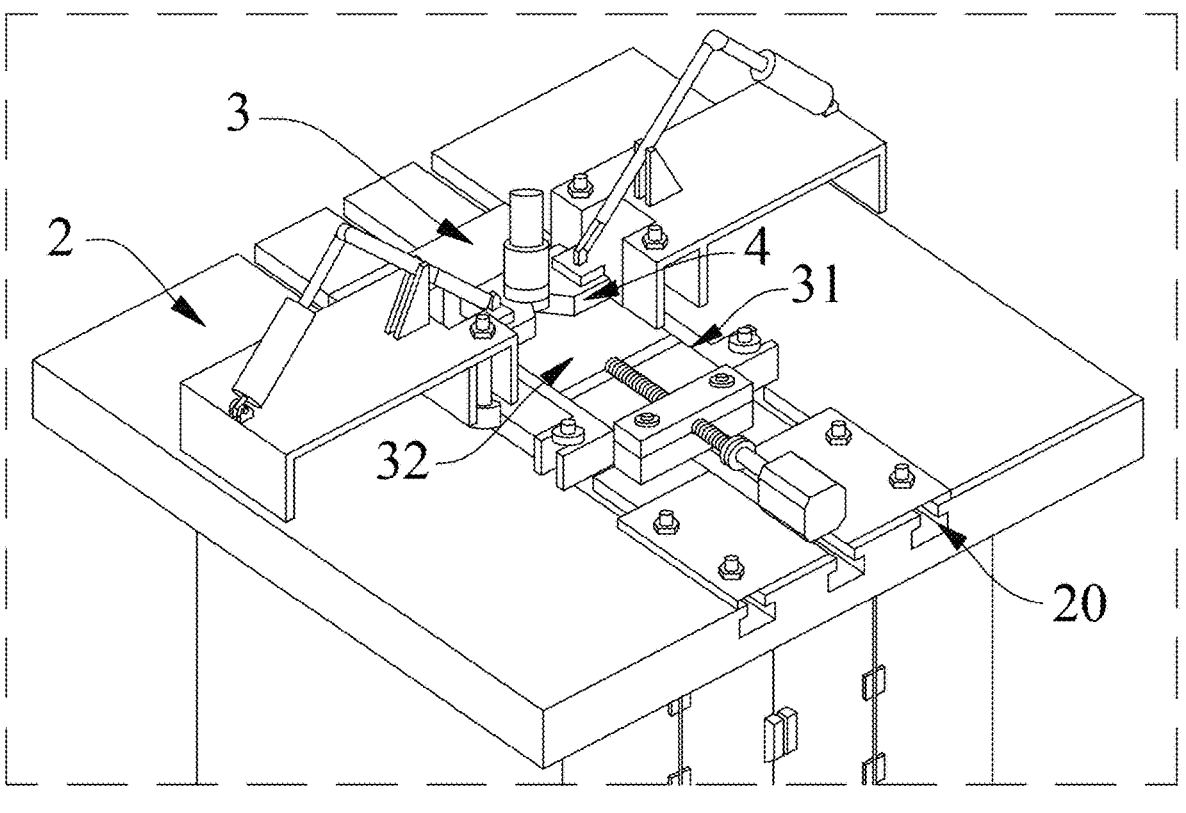
FIG. 2 is a schematic structural diagram of the quick-pressing fixture of the present disclosure from a second perspective.

Referring to FIGS. 1 and 2, a quick-pressing fixture for friction stir spot welding includes a stationary working box 1 and a welding platform 2 integrally connected at the top end of the working box 1.

A welding base 3 is provided with a positioning groove 30 for precise placement of a welding material A, an opening is formed in one side of the positioning groove 30, the welding platform 2 is provided with a plurality of parallel T-shaped grooves 20 for horizontal sliding of the welding base 3, the welding base 3 is further provided with a guide groove 31 integrally connected to the positioning groove 30, and a limiting slide plate 32 is slidably connected in the guide groove 31 of the welding base 3.

What need to be noted are described as below: The working box 1 is movably disposed on the ground, and the working box 1 is provided with a storage space for storing sundries.

A welding press block 4 abuts against the welding base 3 and limits the downward pressing on the welding material A located in the positioning groove 30 of the welding base 3, and the welding press block 4 is distributed movably; the pneumatic quick-pressing mechanisms 5 are configured to clamp the welding material A; the pneumatic quick-pressing mechanism 5 are symmetrically disposed on two sides of an upper surface of the welding platform along a width direction of the welding platform.

The welding base 3 is snapped into the T-shaped grooves 20 in the welding platform 2 by means of bolt and nut fit, and a position of the welding base 3 secured to the welding platform 2 can be adjusted by rotating bolts and nuts.

In the process of specific implementation: first, the pre-assembled welding material A is placed into the positioning groove 30 on the welding base 3, meanwhile one side of the welding material A abuts against a side wall of the positioning groove 30 of the welding base 3, the limiting mechanism 6 then controls the limiting slide plate 32 to move toward the welding material A placed thereon along the guide groove 31 of the welding base 3 until the limiting slide plate 32 abuts against the other side of the welding material A, and the limiting slide plate 32 comes into contact with the welding material A without a pretensioning force first.

Figure 3:
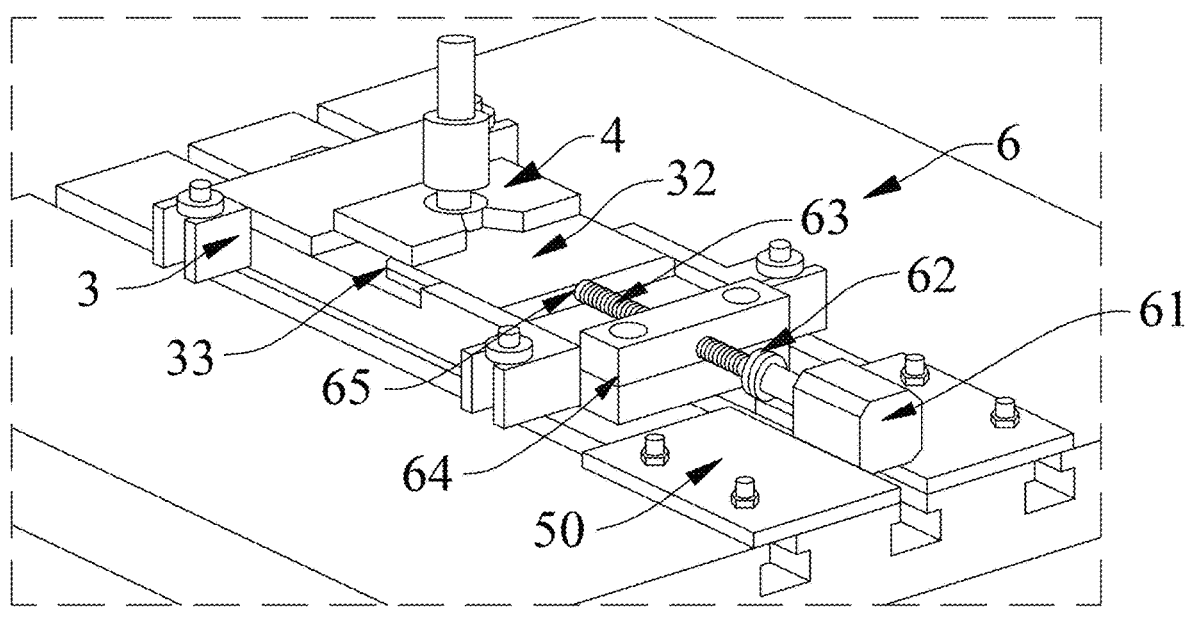
FIG. 3 is a schematic structural diagram of a part between a welding base and a support base of the present disclosure from a first perspective.
Figure 4:
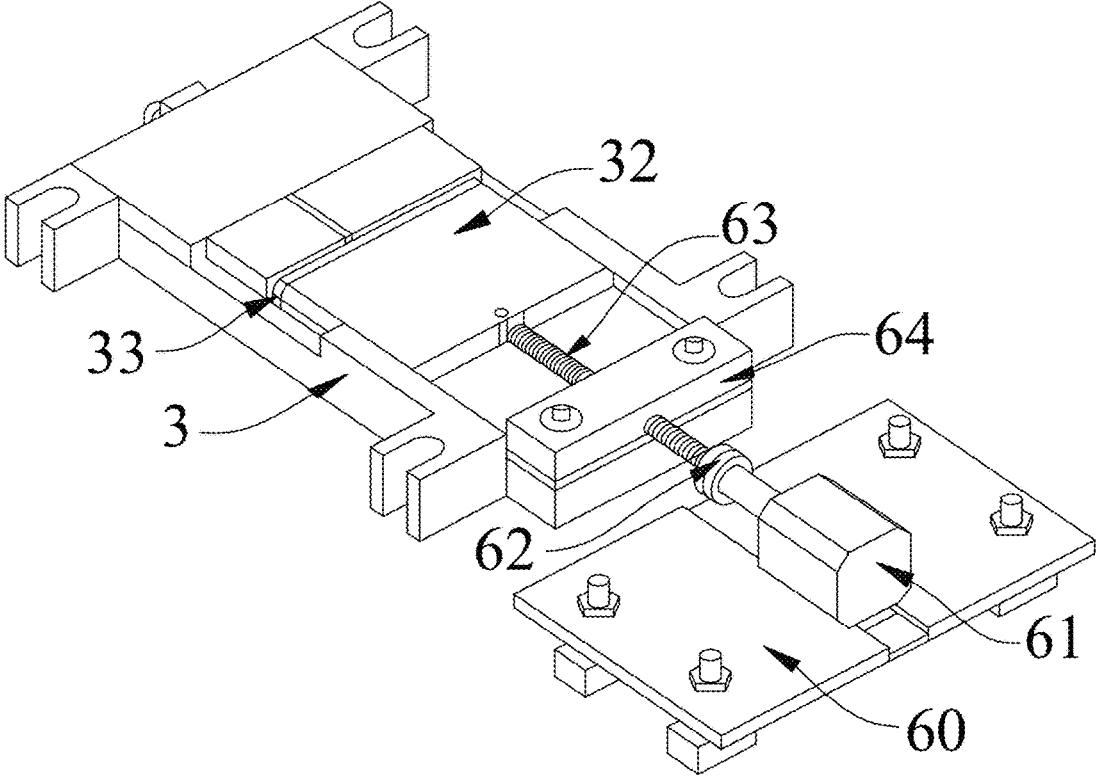
FIG. 4 is a schematic structural diagram of the part between the welding base and the support base of the present disclosure from the second perspective.

Referring to FIGS. 3 and 4, a second pressure sensor 33 is mounted at an end of the limiting slide plate 32 remote from a lead screw 63; it should be noted that the second pressure sensor 33 is disposed on a side of the limiting slide plate 32 close to the welding material A, and when the limiting slide plate 32 moves toward the welding material A, the limiting slide plate 32 limits the welding material A by means of the second pressure sensor 33, and after coming into contact with the welding material A, the second pressure sensor 33 can record a pressure applied thereby to a side wall of the welding material A in real time and keep the pressure to be in a reasonable range.

This configuration aims to avoid an excessively large or small pressure from being applied to the welding material A, so that the excessively large pressure applied to the welding material A causes excessive deformation of the welding material A, increases the stress in the welding area, and results in poor welding firmness.

In the above description, the movement of the limiting slide plate 32 is controlled by the limiting mechanism 6, which will be described as follows.

Referring again to FIGS. 3 and 4, the limiting mechanism 6 for controlling the movement of the limiting slide plate is further disposed on one side of the limiting slide plate 32 of the welding base 3, and the limiting mechanism 6 includes a sliding bottom plate 60, a stepping motor 61, a coupler 62 and the lead screw 63.

The sliding bottom plate 60 is slidably disposed on the T-shaped grooves 20 of the welding platform 2, the stepping motor 61 is slidably disposed on the sliding bottom plate 60, the sliding bottom plate 60 is provided with a strip-shaped sliding groove for sliding of the stepping motor 61, the lead screw 63 is mounted on an output end of the stepping motor 61 by means of the coupler 62, and the lead screw 63 extends toward the limiting slide plate 32.

It should be noted that the sliding bottom plate 60 is secured to the welding platform 2 by the pretensioning force of the bolts and the nuts.

The stepping motor 61 is a conventional known structure, which is an electric motor capable of rotating by a predetermined step length and typically used for applications of precise position or angle control. The operation of the stepping motor 61 is achieved by controlling a current to flow through different phases of the motor, and each time a current pulse is given, the motor rotates at a fixed stepping angle. The stepping motor 61 has the advantages of precise position control and high-torque and low-speed operation, and is therefore widely used in many automation equipment and robotic systems.

In this implementation process, the stepping motor 61 is activated to drive the lead screw 63 to rotate coaxially, the stepping motor 61 performs, during operation, a linear motion in the strip-shaped sliding groove of the sliding bottom plate 60 in an axis direction of the lead screw 63, meanwhile the other end of the lead screw 63 pushes the limiting slide plate 32 to secure the welding material A, and the stepping motor 61 is shut down after securing.

After the limiting slide plate 32 presses and limits the welding material A, in order to ensure the stability of spot welding, the present disclosure provides a welding press block 4.

Figure 5:
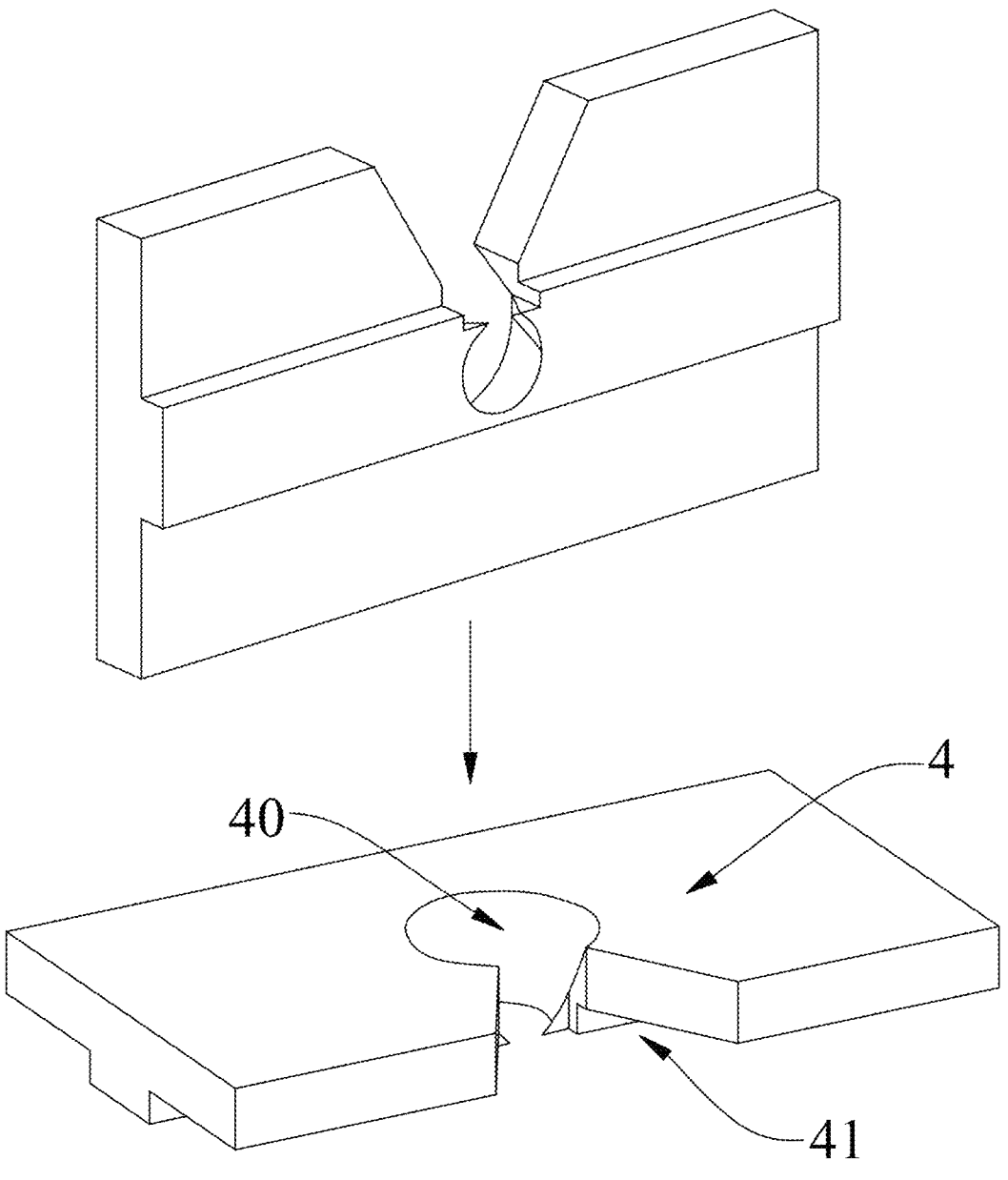
FIG. 5 is a schematic structural diagram of a welding press block of the present disclosure.

Referring to FIGS. 3, 4 and 5, schematic structural diagrams of the welding press block 4 are shown; specifically, the welding press block 4 abuts against the welding base 3 and limits the downward pressing on the welding material A located in the positioning groove 30 of the welding base 3, and the welding press block 4 is distributed movably; the middle of the welding press block 4 is provided with a circular truncated cone through slot 40 for a mixing head C required for welding to move and perform sport welding in a height direction of the welding platform 2, and a V-shaped through groove 41 for observing the entire welding process is further integrally formed at the circular truncated cone through slot 40 of the welding press block 4.

It should be noted that the welding press block 4 is of a T-shaped structure, the middle of the welding press block 4 protrudes outward by a certain distance, in order to clamp the welding materials A of different thicknesses.

When a thickness of the welding material A is less than a height of the positioning groove 30 of the welding base 3, a portion of the welding press block 4 that protrudes outward can extend into the positioning groove 30 to limit the downward pressing on the welding material A.

The welding base 3 is designed with the positioning groove 30 and the guide groove 31, where the positioning groove 30 cooperates with the limiting slide plate 32 to ensure the accurate alignment of the welding material A in the welding process; The design of the guide groove 31 provides a linear motion path for the limiting slide plate 32 to ensure that a press block 54 can move smoothly and accurately to a welding position in the process of pressure application, so as to achieve efficient and uniform clamping.

After the limiting slide plate 32 abuts against one side of the welding material A, the welding press block 4 is placed onto an upper surface of the welding material A, the circular truncated cone through slot 40 of the welding press block 4 is aligned to a gap between two welding materials A, and the V-shaped through groove 41 of the welding press block 4 faces the outside, which are convenient for an outside observer to observe through the V-shaped through groove 41 the entire process of quick connection of the two welding materials A by means of friction stir spot welding.

After the welding press block 4 is placed on the upper surface of the welding material A, the pneumatic quick-pressing mechanism 5 is activated, the welding press block is further secured by the pneumatic quick-pressing mechanism 5 to ensure the stability of the welding material A.

It should be noted that when the limiting slide plate 32 approaches to the welding material A and clamps the welding material A, the limiting slide plate 32 and the lead screw 63 can be disassembled, and for the welding materials A of different sizes and shapes, the limiting slide plates 32 of different shapes can be replaced. Therefore, for quickly removing and mounting the limiting slide plate 32, the present disclosure provides a snap-in block 65.

Figure 6:
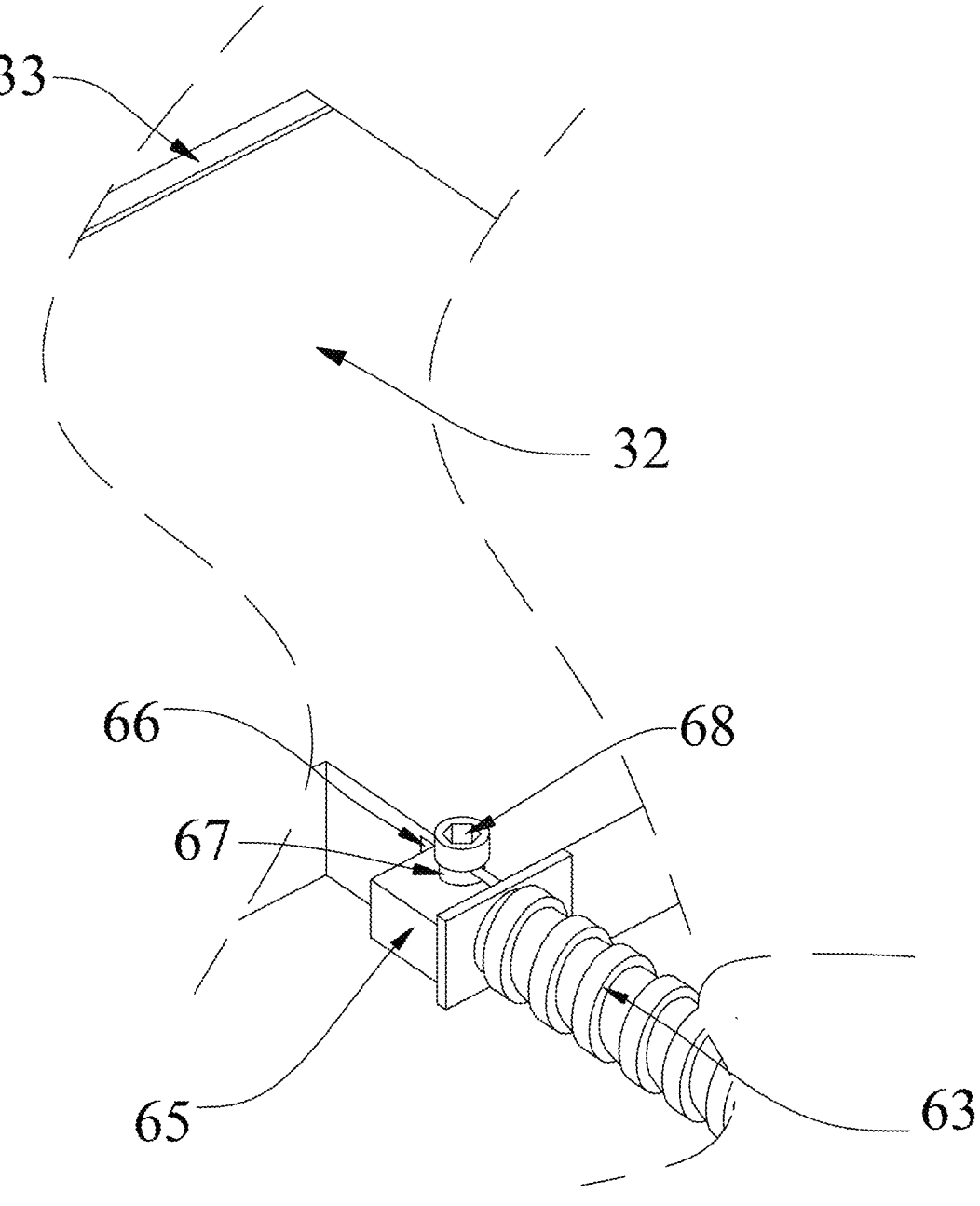
FIG. 6 is a schematic structural diagram of a part between a limiting slide plate and a limiting mechanism of the present disclosure.

Referring to FIGS. 4, 5 and 6, a lead screw securing block 64 is further disposed on the welding base 3, the lead screw 63 is screwed and penetrates the lead screw securing block 64, one side of the lead screw 63 extends toward the limiting slide plate 32 on the welding base 3, and the lead screw securing block 64 is assembled by means of bolts.

By rotating the lead screw 63, the simultaneous movements of the limiting slide plate 32 and the lead screw securing block 64 to which the lead screw is screwed can be controlled.

It should be noted that the screw-thread fit of the lead screw 63 and the lead screw securing block 64 is used, what's the important is using a self-locking function thereof, the retraction of the limiting slide plate 32 in the welding process is prevented, and meanwhile slow retraction can be achieved.

The snap-in block 65 is further integrally connected to an end of the lead screw 63 close to the limiting slide plate 32, the snap-in block 65 is inserted onto the limiting slide plate 32, the limiting slide plate 32 is provided with a catch slot 66 for the insertion of the snap-in block 65, the snap-in block 65 and the limiting slide plate 32 are jointly provided with a circular limiting hole 67, and a connecting bolt 68 is disposed in the circular limiting hole 67.

In the process of specific implementation, in an initial state, the snap-in block 65 is integrally disposed at the end of the lead screw 63 close to the limiting slide plate 32, and the snap-in block 65 is moveably inserted onto the limiting slide plate 32; after the snap-in block 65 is inserted into the catch slot 66 in the limiting slide plate 32, the connecting bolt 68 can penetrate between the snap-in block 65 and the limiting slide plate 32 by rotating the connecting bolt 68, to ensure the stability of the connection between the lead screw 63 and the limiting slide plate 32.

Figure 7:
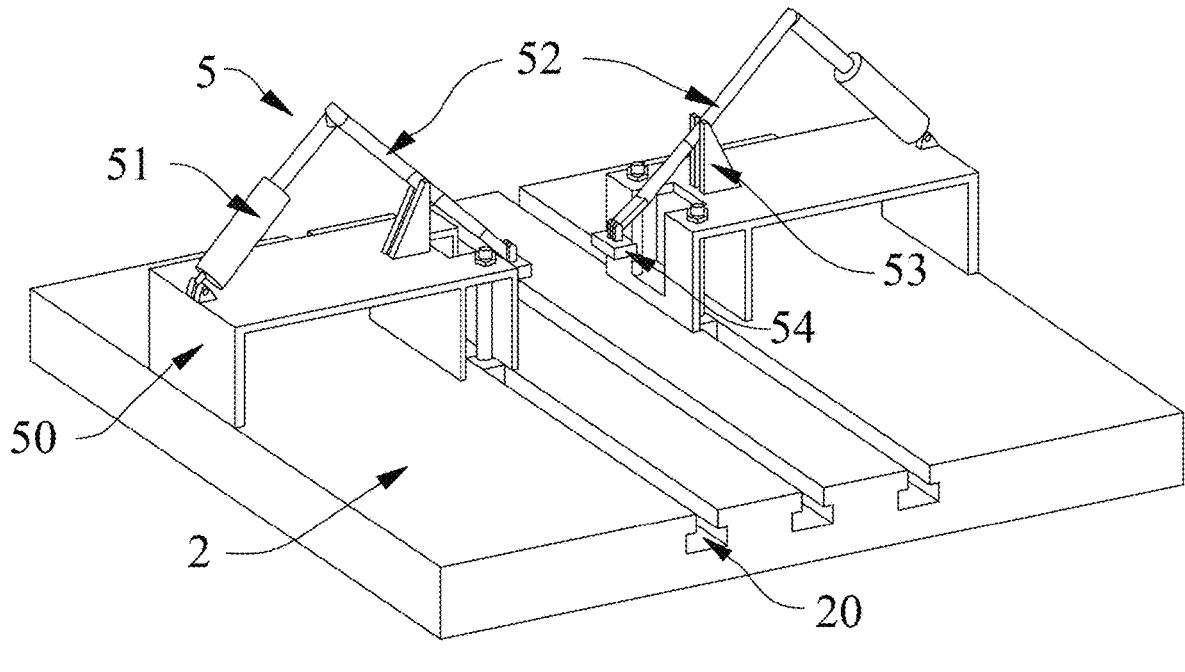
FIG. 7 is a schematic structural diagram of a pneumatic quick-pressing mechanism of the present disclosure from the first perspective.
Figure 8:
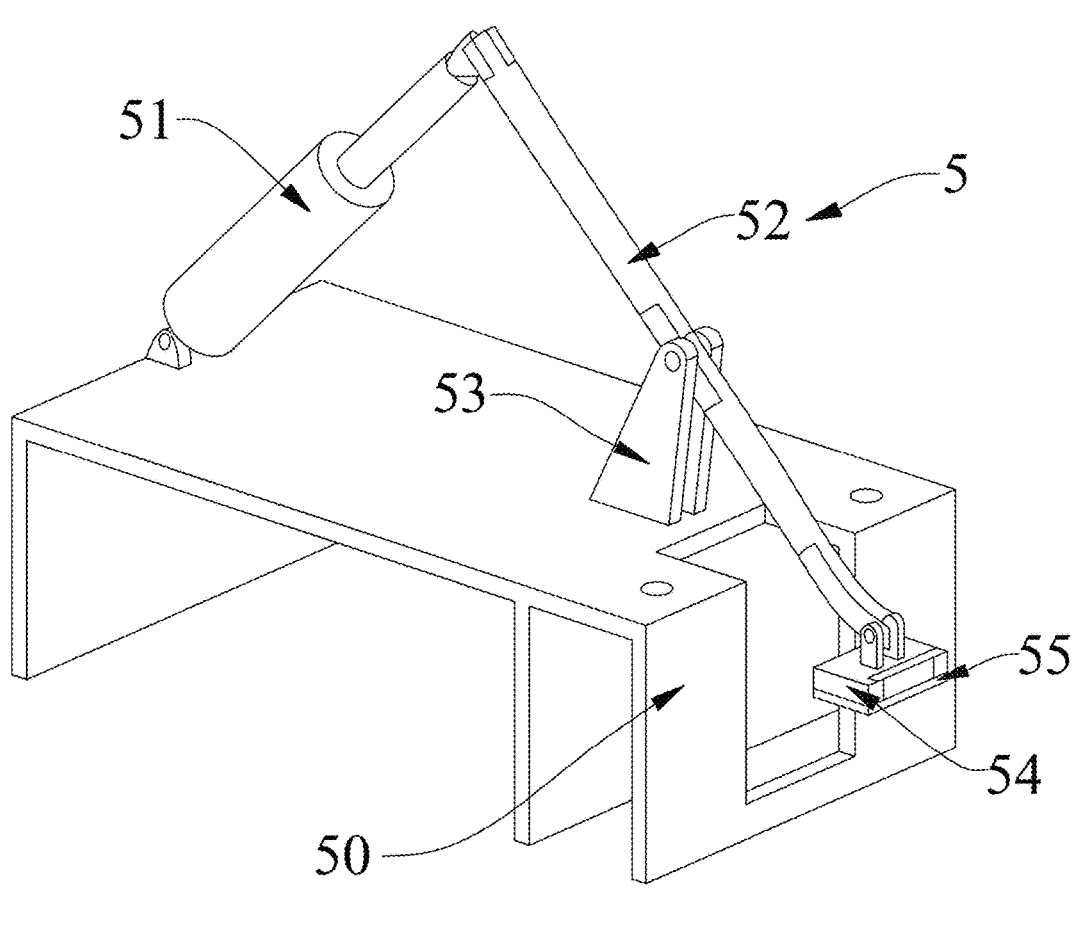
FIG. 8 is a schematic structural diagram of the pneumatic quick-pressing mechanism of the present disclosure from the second perspective.
Figure 9:
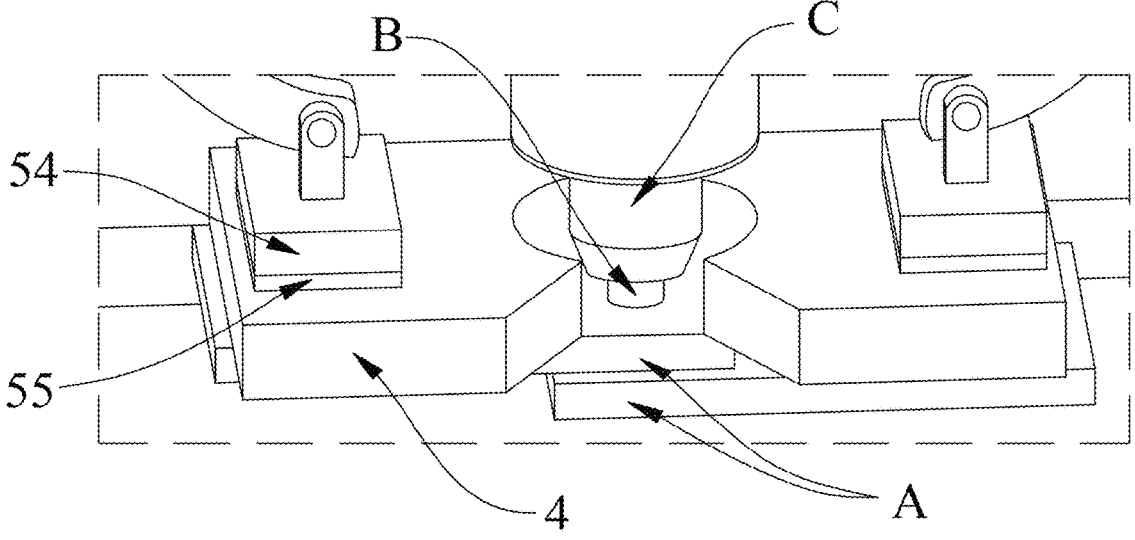
FIG. 9 is a schematic structural diagram of the welding press block, a press block, a stirring head and a welding material of the present disclosure.

Referring to FIGS. 7, 8 and 9, schematic structural diagrams of the pneumatic quick-pressing mechanism 5 in the present disclosure are shown; the pneumatic quick-pressing mechanism 5 includes a support base 50, a pneumatic cylinder 51, an operating crank 52, a support frame 53, a press block 54 and a first pressure sensor 55.

The support bases 50 are symmetrically mounted at a top end of the welding platform 2 at two sides of a top end of the welding platform along two sides in the length direction, the pneumatic cylinder 51 is hinged to one side of the support base 50, an output end of the pneumatic cylinder 51 obliquely extends outward, and the operating crank 52 is hinged to the support base 50 by means of the support frame 53; one side of the operating crank 52 is hinged to the output end of the pneumatic cylinder 51 each other, the other side of the operating crank 52 is hinged to the press block 54 each other, the bottom of the press block 54 is provided with the first pressure sensor 55 which monitors a pressure for pressing the welding press block 4 in real time, and the press block 54 and the first pressure sensor 55 remain in a horizontal state at all times.

It should be noted that the first pressure sensor 55 is of a conventional known structure and is identical to the second pressure sensor 33. Also, the first pressure sensor 55 can perform the detection on the magnitude of the pressure of the press block 54 to the welding press block 4.

In the process of specific implementation, after the welding press block 4 is placed on the upper surface of the welding material A, the pneumatic cylinder 51 is activated, the output end of the pneumatic cylinder 51 pushes one side of the operating crank 52 to move upward, the middle of the operating crank 52 is rotated with a support point of the support frame 53 as an axis, and the press block 54 disposed at the other end of the operating crank 52 further moves downward, such the press block 54 and the first pressure sensor 55 at the bottom of the press block 54 move toward the welding press block 4 until the first pressure sensor 55 abuts against the welding press block 4, the welding press block 4 is pressed and secured by two symmetrically distributed first pressure sensors 55, allowing the welding press block 4 to further abut against the welding material A.

A high-pressure gas is introduced into the pneumatic cylinder 51, a piston rod of the pneumatic cylinder 51 extends out from a cylinder body, driving one side of the operating crank at a joint with a top end of the piston rod to ascend, and successively one end of the operating crank connected to the press block 54 descends; the inside of the cylinder 51 releases the high-pressure gas, gas suction continues to create a negative pressure in the cylinder 51, the piston rod is retracted toward the inside of the cylinder body, thus driving the operating crank 52 on the side connected to the piston rod to descend, and finally the press block 54 is lifted up to be separated from the welding press block 4.

Two pieces of welding materials A are involved in the present disclosure. Specifically, referring to FIG. 9, circular holes of the two pieces of welding materials A are aligned and overlap, and a rivet B is then inserted in the overlapping circular holes thereof. After the alignment and limiting by means of the quick-pressing fixture of the present disclosure, the friction stir spot welding is performed at a position where the rivet B is located by means of the mixing head C until the quick-pressing fixture secures the two welding materials A.

Embodiment 2

Figure 10:
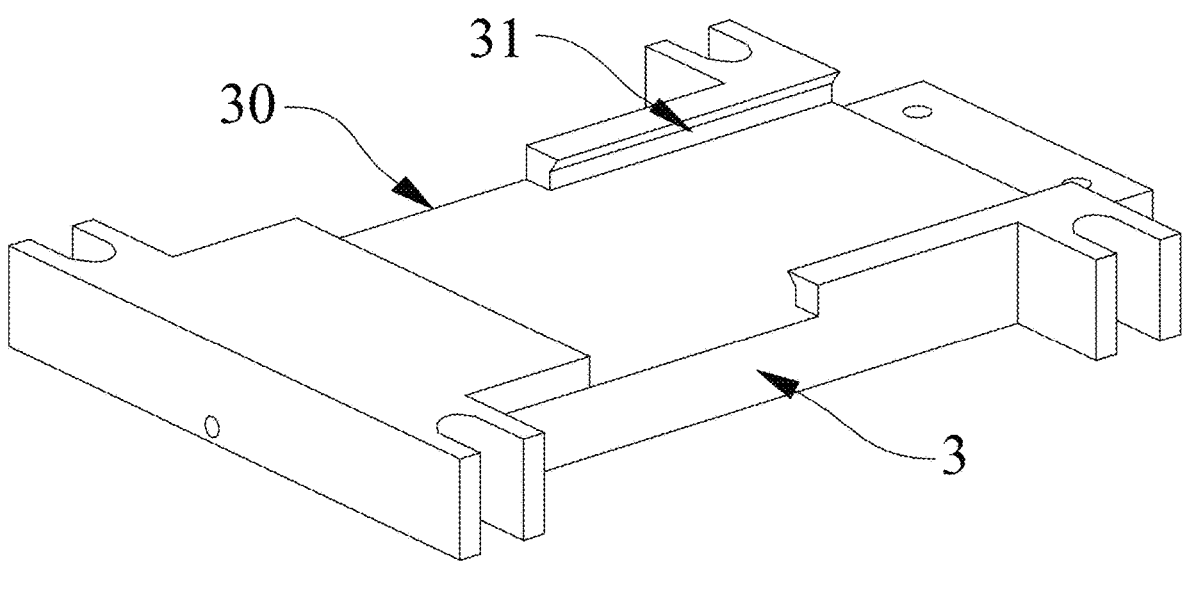
FIG. 10 is a schematic structural diagram of the welding base of the present disclosure.
Figure 11:
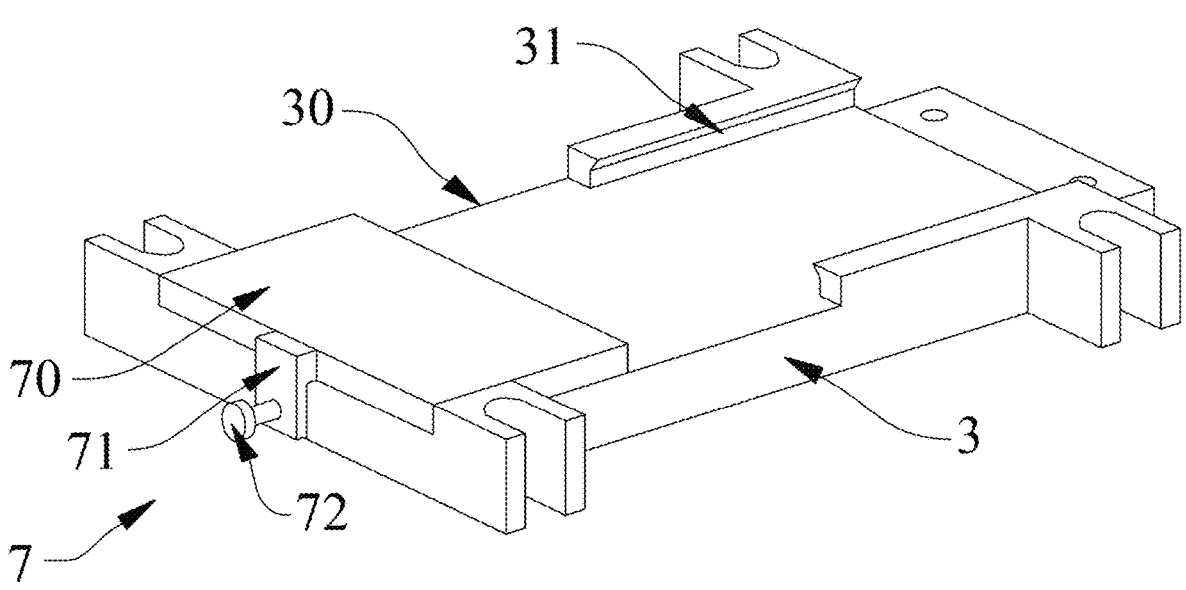
FIG. 11 is a schematic structural diagram of a part between the welding base and an adjustment member of the present disclosure.

Referring to FIGS. 10 and 11, on the basis of Embodiment 1, in order to further ensure the efficiency and the practicability of the quick-pressing fixture in the present disclosure, the present disclosure provides an adjustment member 7. By means of the adjustment member 7, it can be effectively ensured that the quick-pressing fixture in the present disclosure clamps welding materials A of different sizes, and accordingly the practicability of the present disclosure is remarkably improved; specifically, the positioning groove 30 of the welding base 3 is further provided with the adjustment member 7 for adjusting the size of the positioning groove 30, the adjustment member 7 includes an adjustment plate 70 slidably disposed on one side of the welding base 3, a connecting block 71 and an adjustment screw 72, the adjustment screw 72 is screwed to an end of the welding base 3 remote from the lead screw securing block 64, the connecting block 71 is mounted on the adjustment screw 72, and the connecting block 71 is connected to the adjustment plate 70.

In the present disclosure, the welding material A is mainly placed in the positioning groove 30 of the welding base 3, and the welding materials A of different sizes can be placed by adjusting the size of the positioning groove 30.

Moreover, the size of the positioning groove 30 is adjusted by rotating the adjustment screw 72, the adjustment plate 70 is controlled to move away from the limiting slide plate 32 by means of the adjustment screw 72 until the size of the positioning groove 30 is adjusted to reach a specified size.

Embodiment 3

Figure 12:
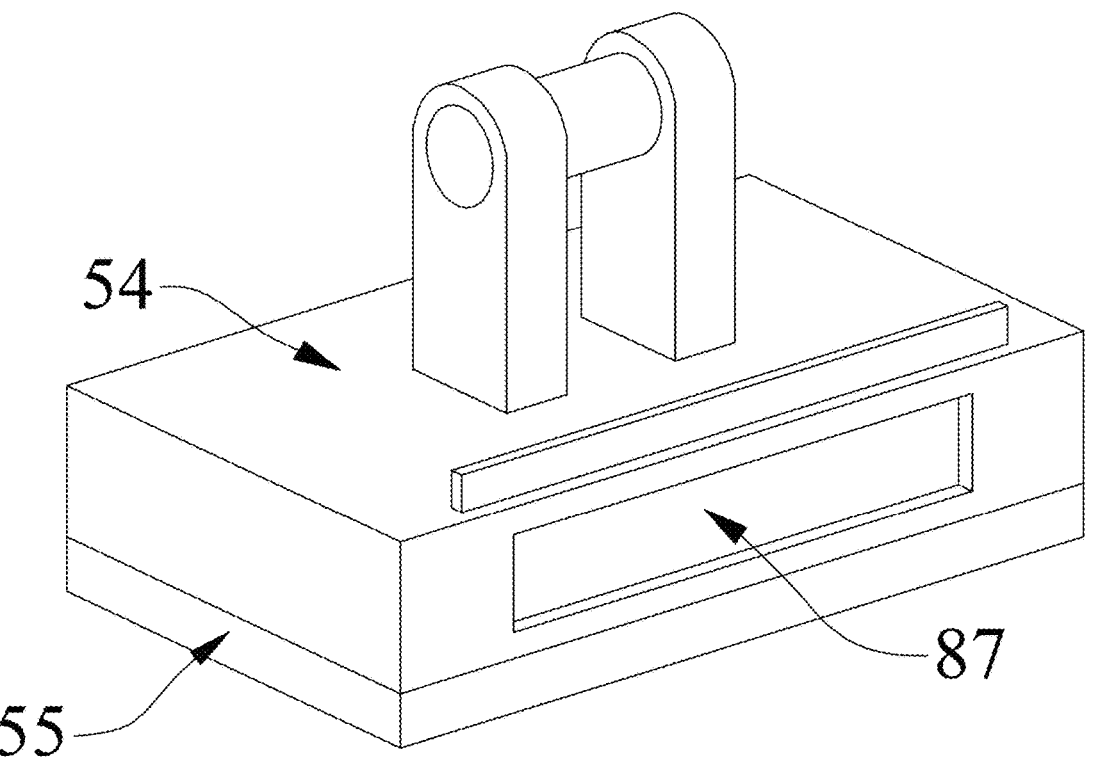
FIG. 12 is a schematic structural diagram of a part between the press block and a suction mechanism of the present disclosure.
Figure 13:
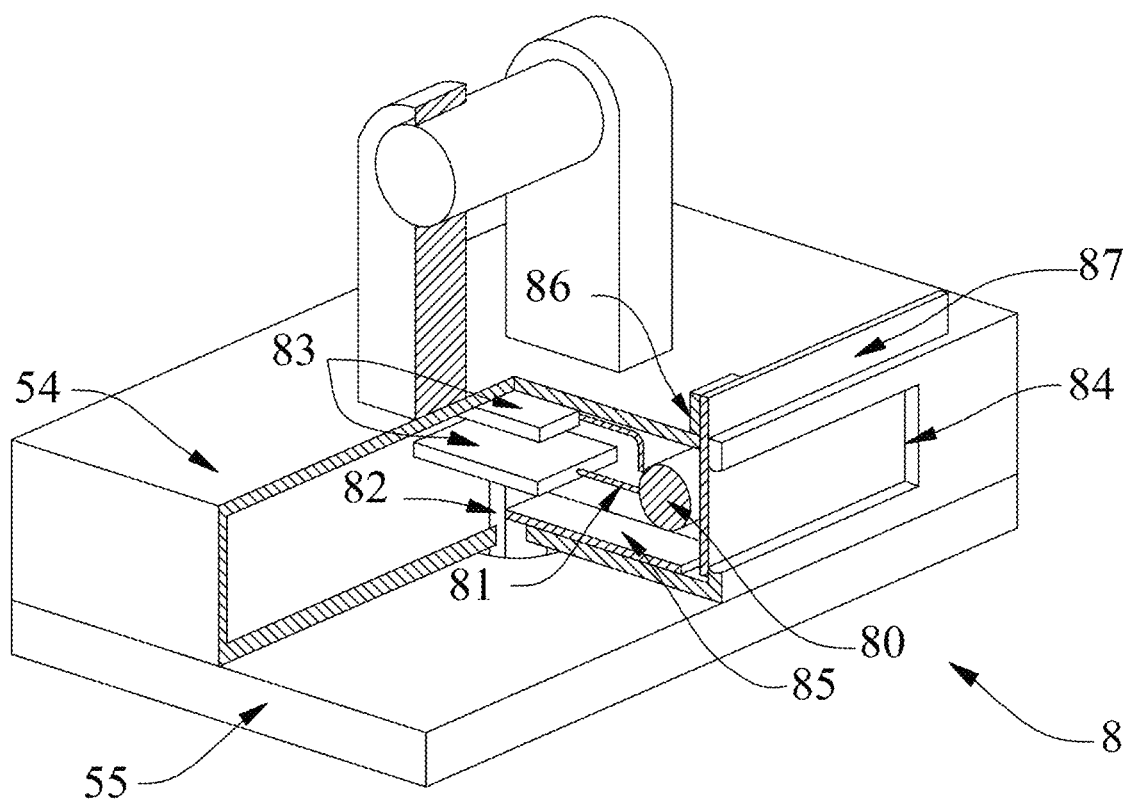
FIG. 13 is a schematic structural diagram of the suction mechanism of the present disclosure from the first perspective.
Figure 14:
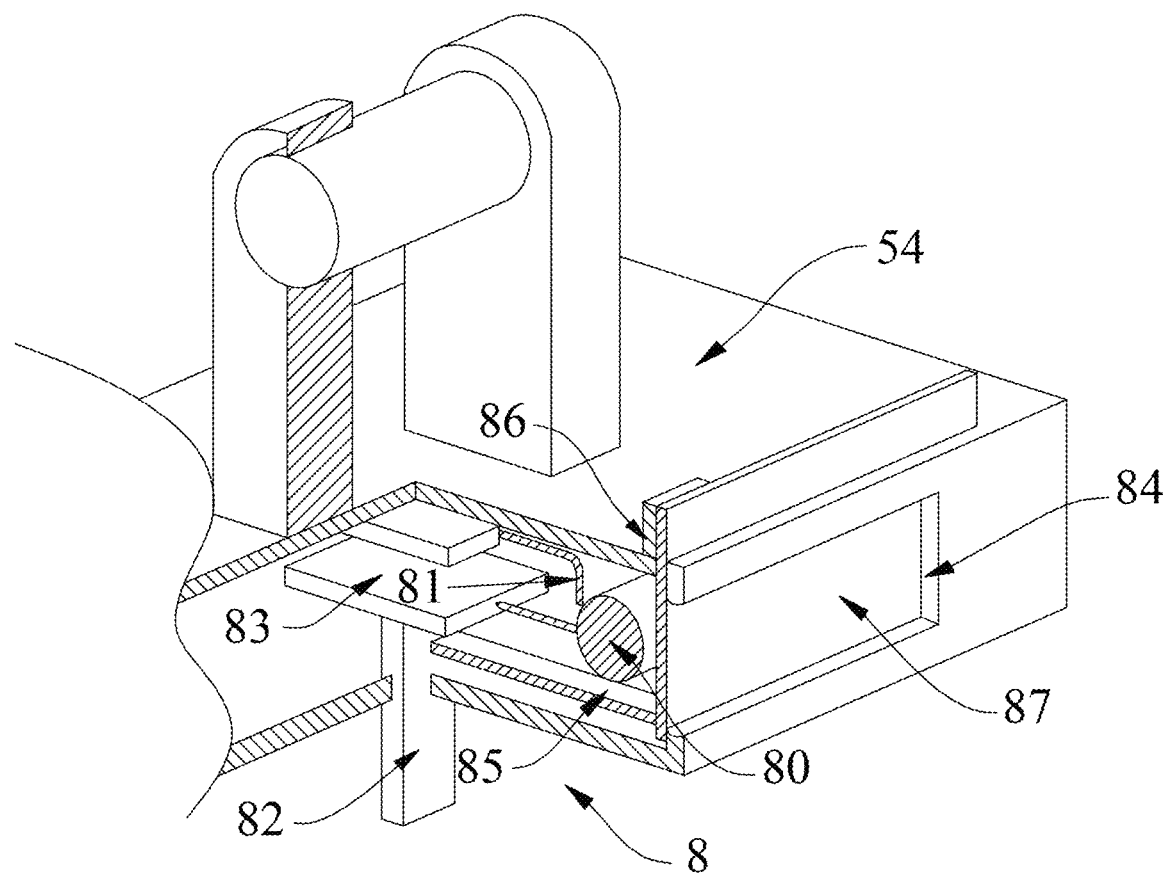
FIG. 14 is a schematic structural diagram of the suction mechanism of the present disclosure from the second perspective.

Referring to FIGS. 12, 13 and 14, the efficiency of friction stir spot welding is again improved on the basis of Embodiment 2. The present disclosure further provides a suction mechanism 8, the suction mechanism 8 is disposed on the press block 54, and after the press block 54 abuts against the welding press block 4, the suction mechanism 8 is automatically opened and begins to suck gas, causing the vicinity of the circular truncated cone through slot 40 of the welding press block 4 to be in a negative pressure state, and sucking the gas mingled with smoke dust in the vicinity thereof, specifically, the press block 54 is further provided with the suction mechanism 8, the suction mechanism 8 includes a suction machine 80, a wire 81 and a trigger lever 82, the suction machines 80 are disposed on two opposite sides of the two press blocks 54, and a suction opening 84 is formed in an end of the press block 54 close to the suction machine 80.

The wire 81 is mounted on a back side of the suction machine 80, the middle of the wire 81 is provided with two metal trigger sheets 83, the two metal trigger sheets 83 are symmetrically disposed in the press block 54 in a height direction of the press block 54, the metal trigger sheet 83 on one side is slidably disposed, the metal trigger sheet 83 on the other side abuts against an inner wall of the press block 54, the trigger lever 82 abuts against the slidably disposed metal trigger sheet 83, and the trigger lever 82 slidably penetrates the press block 54 and extends toward the welding press block 4.

A linkage lever 85 is further connected to one side of the trigger lever 82, an opening-closing door 87 slidably mounted in the suction opening 84 of the press block 54 is disposed at an end of the linkage lever 85 remote from the trigger lever 82, and a reset tension spring 86 is connected between the opening-closing door 87 and the press block 54.

It should be noted that the opening-closing door 87 covers the suction opening 84 of the press block 54 in the initial state to cover the suction opening 84.

In the process of specific implementation, when the press block 54 is pressed downward against the welding press block 4, the trigger lever 82 at the bottom of the press block 54 is pressed to move toward the inside of the press block 54, and at this moment, the trigger lever 82 controls the opening-closing door 87 to move upward by means of the linkage lever 85, such that the opening-closing door 87 of the press block 54 is opened in preparation for rapid cooling by absorbing high-temperature heat generated in spot welding.

After the trigger lever 82 is moved upward to the metal trigger sheet 83 at the top thereof and comes into contact with the metal trigger sheet 83 disposed in the press block 54, the suction machine 80 is powered on to begin operation, generating a strong suction force which absorbs air in the vicinity of the welding press block 4 into the suction machine 80; when the stirring head C is subjected to rotary friction spot welding, a certain high temperature is generated to gradually rise a temperature around the stirring head C, and a high-temperature gas surrounds the stirring head C; at the same time, because of the circular truncated cone through slot 40 of the welding press block 4 surrounds the high-temperature gas, the high-temperature gas diffuses slowly, which is further adverse to cooling the welding material A after the spot welding.

Therefore, after the suction machine 80 is activated, the gas is rapidly sucked, causing the gas in the vicinity of the suction opening 84 thereof to flow, and thus indirectly causing the high-temperature gas generated around the stirring head C to flow, until the high-temperature gas generated around the stirring head C due to the spot welding is quickly sucked; accordingly, an effect of cooling the welding material A subjected to spot welding connection is played, the cooling and setting of the welding material A after the spot welding are sped up, and the efficiency of the welding material A is indirectly improved.

After the spot welding on the welding material A is completed, the press block 54 is moved upward away from the welding press block 4, at this moment, the suction machine 80 is automatically powered off to stop gas suction, and the suction opening 84 of the press block 54 is then closed to avoid external foreign objects from entering the suction opening 84.

Figure 15:
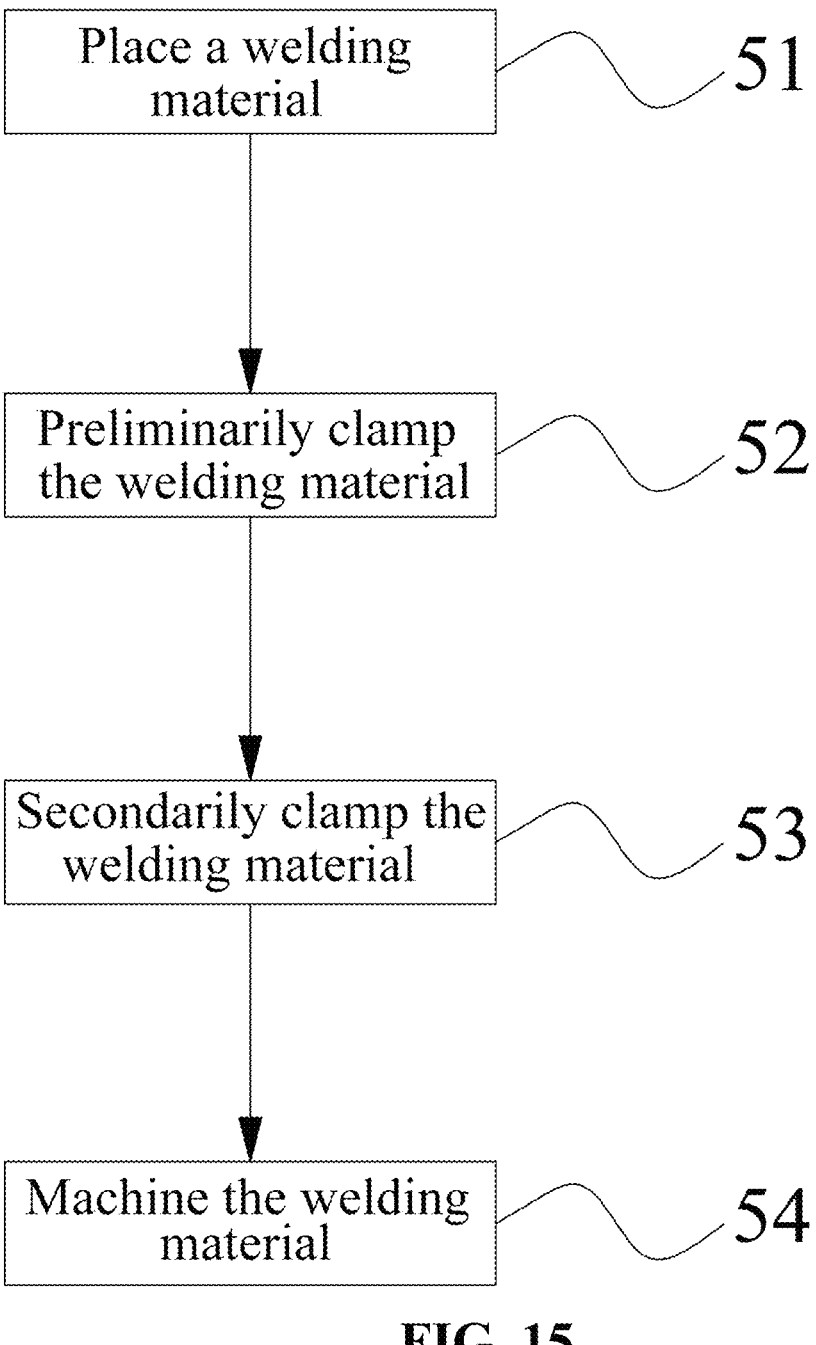
FIG. 15 is a use flow chart of a quick-pressing fixture for friction stir spot welding of the present disclosure.

Referring to FIG. 15, the present disclosure further provides a use method of a quick-pressing fixture for friction stir spot welding, which will be described as follows:

S1, place the welding material: the welding material A to be machined is placed on the welding base 3, and the limiting slide plate 32 on the welding base 3 is then controlled to move in a direction where the welding material A is located, until the limiting slide plate 32 abuts against the side wall of the welding material A.

S2, preliminarily clamp the welding material: after the welding material A is pressed and limited by the limiting slide plate 32, and the welding press block 4 is placed on a surface of the welding material A while the welding press block 4 is located at the middle of the welding material A.

S3, secondarily clamp the welding material: the pneumatic quick-pressing mechanism 5 is activated to press down the welding press block 4, such that the welding press block 4 secondarily limits the welding material A at the bottom thereof.

S4, machine the welding material: after the welding material A is limited by the limiting slide plate 32 and the press block 54, the stirring head C is activated to perform a spot welding operation on the welding material A, meanwhile, the suction opening 84 of the press block 54 is opened, the suction machine 80 inside the suction opening is powered on to begin the operation, the high-temperature gas generated during spot welding of the mixing head C is sucked, the cooling of the welding material A after the spot welding is sped up, and finally the welding material A subjected to the spot welding is taken out after the welding is finished.

The embodiments of the specific implementations are preferred embodiments of the present disclosure and are not intended to limit the scope of protection of the present disclosure accordingly. Therefore, all equivalent changes made in accordance with the structure, shape and principle of the present disclosure shall be included in the scope of protection of the present disclosure.

What is claimed is:

1. A quick-pressing fixture for friction stir spot welding, comprising a stationary working box (1) and a welding platform (2) integrally connected at a top end of the working box (1), wherein, a welding base (3) is provided with a positioning groove (30) for precise placement of a welding material, an opening is formed in one side of the positioning groove (30), the welding platform (2) is provided with a plurality of parallel T-shaped grooves (20) for horizontal sliding of the welding base (3), the welding base (3) is further provided with a guide groove (31) integrally connected to the positioning groove (30), and a limiting slide plate (32) is slidably connected in the guide groove (31) of the welding base (3);

a welding press block (4) abuts against the welding base (3) and limits the downward pressing on the welding material located in the positioning groove (30) of the welding base (3), and the welding press block (4) is distributed movably;

the pneumatic quick-pressing mechanisms (5) are configured to clamp the welding material; the pneumatic quick-pressing mechanisms (5) are symmetrically disposed on two sides of an upper surface of the welding platform along a width direction of the welding platform;

the pneumatic quick-pressing mechanism (5) comprises a support base (50), a pneumatic cylinder (51), an operating crank (52), a support frame (53), a press block (54) and a first pressure sensor (55);

the support bases (50) are symmetrically mounted at two sides of a top end of the welding platform along a length direction of the welding platform, the pneumatic cylinder (51) is hinged to one side of the support base (50), an output end of the pneumatic cylinder (51) obliquely extends outward, and the operating crank (52) is hinged to the support base (50) by means of the support frame (53); one side of the operating crank (52) is hinged to the output end of the pneumatic cylinder (51) each other, the other side of the operating crank (52) is hinged to the press block (54) each other, a bottom of the press block (54) is provided with the first pressure sensor (55) which monitors a pressure for pressing the welding press block (4) in real time, and the press block (54) and the first pressure sensor (55) remain in a horizontal state at all times;

the press block (54) is further provided with a suction mechanism (8), the suction mechanism (8) comprises a suction machine (80), a wire (81) and a trigger lever (82), the suction machines (80) are disposed on two opposite sides of two press blocks (54), and a suction opening (84) is formed in an end of the press block (54) close to the suction machine (80);

the wire (81) is mounted on a back side of the suction machine (80), the middle of the wire (81) is provided with two metal trigger sheets (83), the two metal trigger sheets (83) are symmetrically disposed in the press block (54) in a height direction of the press block (54), the metal trigger sheet (83) on one side is slidably disposed, the metal trigger sheet (83) on another side abuts against an inner wall of the press block (54), the trigger lever (82) abuts against the slidably disposed metal trigger sheet (83), and the trigger lever (82) slidably penetrates the press block (54) and extends toward the welding press block (4); and a linkage lever (85) is further connected to one side of the trigger lever (82), an opening-closing door (87) slidably mounted in the suction opening (84) of the press block (54) is disposed at an end of the linkage lever (85) remote from the trigger lever (82), and a reset tension spring (86) is connected between the opening-closing door (87) and the press block (54).

2. The quick-pressing fixture for friction stir spot welding according to claim 1, wherein the middle of the welding press block (4) is provided with a circular truncated cone through slot (40) for a mixing head required for welding to move and perform sport welding in a height direction of the welding platform (2), and a V-shaped through groove (41) for observing the entire welding process is further integrally formed at the circular truncated cone through slot (40) of the welding press block (4).

3. The quick-pressing fixture for friction stir spot welding according to claim 1, wherein a limiting mechanism (6) for controlling a movement of the limiting slide plate is further disposed on one side of the limiting slide plate (32) on the welding base (3), and the limiting mechanism (6) comprises a sliding bottom plate (60), a stepping motor (61), a coupler (62) and a lead screw (63); and the sliding bottom plate (60) is slidably disposed on the T-shaped grooves (20) of the welding platform (2), the stepping motor (61) is slidably disposed on the sliding bottom plate (60), the sliding bottom plate (60) is provided with a strip-shaped sliding groove for sliding of the stepping motor (61), the lead screw (63) is mounted on an output end of the stepping motor (61) by means of the coupler (62), and the lead screw (63) extends toward the limiting slide plate (32).

4. The quick-pressing fixture for friction stir spot welding according to claim 1, wherein a second pressure sensor (33) is mounted at an end of the limiting slide plate (32) remote from the lead screw (63).

5. The quick-pressing clamp for friction stir spot welding according to claim 3, wherein a lead screw securing block (64) is further disposed on the welding base (3), the lead screw (63) is screwed and penetrates the lead screw securing block (64), one side of the lead screw (63) extends toward the limiting slide plate (32) on the welding base (3), and the lead screw securing block (64) is assembled by means of bolts.

6. The quick-pressing fixture for friction stir spot welding according to claim 5, wherein a snap-in block (65) is further integrally connected to an end of the lead screw (63) close to the limiting slide plate (32), the snap-in block (65) is inserted onto the limiting slide plate (32), the limiting slide plate (32) is provided with a catch slot (66) for the insertion of the snap-in block (65), the snap-in block (65) and the limiting slide plate (32) are jointly provided with a circular limiting hole (67), and a connecting bolt (68) is disposed in the circular limiting hole (67).

7. The quick-pressing fixture for friction stir spot welding according to claim 3, wherein the welding base (3) and the sliding bottom plate (60) are disposed in the T-shaped grooves (20) of the welding platform (2) by means of bolts and nuts.

8. The quick-pressing fixture for friction stir spot welding according to claim 1, wherein a side of the support base (50) close to the press block (54) is provided with a movement groove for the rotation of the operating crank (52).

9. A method for using a quick-pressing fixture for friction stir spot welding, using a quick-pressing fixture for friction stir spot welding according to claim 1, wherein the method comprises:

S1, placing a welding material: placing the welding material to be machined on the welding base (3), and controlling the limiting slide plate (32) on the welding base (3) to move in a direction where the welding material is located, until the limiting slide plate (32) abuts against a side wall of the welding material;

S2, preliminarily clamping the welding material: after the welding material is pressed and limited by the limiting slide plate (32), placing the welding press block (4) on a surface of the welding material while the welding press block (4) is located at the middle of the welding material;

S3, preliminarily clamping the welding material: activating the pneumatic quick-pressing mechanism (5) to press down the welding press block (4), such that the welding press block (4) secondarily limits the welding material at the bottom of the welding press block; and S4, machining the welding material: after the welding material is clamped and limited, activating the mixing head to perform a spot welding operation on the welding material until the welding is completed, and finally taking out the welding material subjected to the spot welding after the welding is finished.

10. A method for using a quick-pressing fixture for friction stir spot welding, using a quick-pressing fixture for friction stir spot welding according to claim 2, wherein the method comprises:

S1, placing a welding material: placing the welding material to be machined on the welding base (3), and controlling the limiting slide plate (32) on the welding base (3) to move in a direction where the welding material is located, until the limiting slide plate (32) abuts against a side wall of the welding material;

S2, preliminarily clamping the welding material: after the welding material is pressed and limited by the limiting slide plate (32), placing the welding press block (4) on a surface of the welding material while the welding press block (4) is located at the middle of the welding material;

S3, preliminarily clamping the welding material: activating the pneumatic quick-pressing mechanism (5) to press down the welding press block (4), such that the welding press block (4) secondarily limits the welding material at the bottom of the welding press block; and S4, machining the welding material: after the welding material is clamped and limited, activating the mixing head to perform a spot welding operation on the welding material until the welding is completed, and finally taking out the welding material subjected to the spot welding after the welding is finished.

11. A method for using a quick-pressing fixture for friction stir spot welding, using a quick-pressing fixture for friction stir spot welding according to claim 3, wherein the method comprises:

S1, placing a welding material: placing the welding material to be machined on the welding base (3), and controlling the limiting slide plate (32) on the welding base (3) to move in a direction where the welding material is located, until the limiting slide plate (32) abuts against a side wall of the welding material;

S2, preliminarily clamping the welding material: after the welding material is pressed and limited by the limiting slide plate (32), placing the welding press block (4) on a surface of the welding material while the welding press block (4) is located at the middle of the welding material;

S3, preliminarily clamping the welding material: activating the pneumatic quick-pressing mechanism (5) to press down the welding press block (4), such that the welding press block (4) secondarily limits the welding material at the bottom of the welding press block; and S4, machining the welding material: after the welding material is clamped and limited, activating the mixing head to perform a spot welding operation on the welding material until the welding is completed, and finally taking out the welding material subjected to the spot welding after the welding is finished.

12. A method for using a quick-pressing fixture for friction stir spot welding, using a quick-pressing fixture for friction stir spot welding according to claim 4, wherein the method comprises:

S1, placing a welding material: placing the welding material to be machined on the welding base (3), and controlling the limiting slide plate (32) on the welding base (3) to move in a direction where the welding material is located, until the limiting slide plate (32) abuts against a side wall of the welding material;

S2, preliminarily clamping the welding material: after the welding material is pressed and limited by the limiting slide plate (32), placing the welding press block (4) on a surface of the welding material while the welding press block (4) is located at the middle of the welding material;

S3, preliminarily clamping the welding material: activating the pneumatic quick-pressing mechanism (5) to press down the welding press block (4), such that the welding press block (4) secondarily limits the welding material at the bottom of the welding press block; and S4, machining the welding material: after the welding material is clamped and limited, activating the mixing head to perform a spot welding operation on the welding material until the welding is completed, and finally taking out the welding material subjected to the spot welding after the welding is finished.

13. A method for using a quick-pressing fixture for friction stir spot welding, using a quick-pressing fixture for friction stir spot welding according to claim 5, wherein the method comprises:

S1, placing a welding material: placing the welding material to be machined on the welding base (3), and controlling the limiting slide plate (32) on the welding base (3) to move in a direction where the welding material is located, until the limiting slide plate (32) abuts against a side wall of the welding material;

S2, preliminarily clamping the welding material: after the welding material is pressed and limited by the limiting slide plate (32), placing the welding press block (4) on a surface of the welding material while the welding press block (4) is located at the middle of the welding material;

S3, preliminarily clamping the welding material: activating the pneumatic quick-pressing mechanism (5) to press down the welding press block (4), such that the welding press block (4) secondarily limits the welding material at the bottom of the welding press block; and S4, machining the welding material: after the welding material is clamped and limited, activating the mixing head to perform a spot welding operation on the welding material until the welding is completed, and finally taking out the welding material subjected to the spot welding after the welding is finished.

14. A method for using a quick-pressing fixture for friction stir spot welding, using a quick-pressing fixture for friction stir spot welding according to claim 6, wherein the method comprises:

S1, placing a welding material: placing the welding material to be machined on the welding base (3), and controlling the limiting slide plate (32) on the welding base (3) to move in a direction where the welding material is located, until the limiting slide plate (32) abuts against a side wall of the welding material;

S2, preliminarily clamping the welding material: after the welding material is pressed and limited by the limiting slide plate (32), placing the welding press block (4) on a surface of the welding material while the welding press block (4) is located at the middle of the welding material;

S3, preliminarily clamping the welding material: activating the pneumatic quick-pressing mechanism (5) to press down the welding press block (4), such that the welding press block (4) secondarily limits the welding material at the bottom of the welding press block; and S4, machining the welding material: after the welding material is clamped and limited, activating the mixing head to perform a spot welding operation on the welding material until the welding is completed, and finally taking out the welding material subjected to the spot welding after the welding is finished.

15. A method for using a quick-pressing fixture for friction stir spot welding, using a quick-pressing fixture for friction stir spot welding according to claim 7, wherein the method comprises:

S1, placing a welding material: placing the welding material to be machined on the welding base (3), and controlling the limiting slide plate (32) on the welding base (3) to move in a direction where the welding material is located, until the limiting slide plate (32) abuts against a side wall of the welding material;

S2, preliminarily clamping the welding material: after the welding material is pressed and limited by the limiting slide plate (32), placing the welding press block (4) on a surface of the welding material while the welding press block (4) is located at the middle of the welding material;

S3, preliminarily clamping the welding material: activating the pneumatic quick-pressing mechanism (5) to press down the welding press block (4), such that the welding press block (4) secondarily limits the welding material at the bottom of the welding press block; and S4, machining the welding material: after the welding material is clamped and limited, activating the mixing head to perform a spot welding operation on the welding material until the welding is completed, and finally taking out the welding material subjected to the spot welding after the welding is finished.

16. A method for using a quick-pressing fixture for friction stir spot welding, using a quick-pressing fixture for friction stir spot welding according to claim 8, wherein the method comprises:

S1, placing a welding material: placing the welding material to be machined on the welding base (3), and controlling the limiting slide plate (32) on the welding base (3) to move in a direction where the welding material is located, until the limiting slide plate (32) abuts against a side wall of the welding material;

S2, preliminarily clamping the welding material: after the welding material is pressed and limited by the limiting slide plate (32), placing the welding press block (4) on a surface of the welding material while the welding press block (4) is located at the middle of the welding material;

S3, preliminarily clamping the welding material: activating the pneumatic quick-pressing mechanism (5) to press down the welding press block (4), such that the welding press block (4) secondarily limits the welding material at the bottom of the welding press block; and S4, machining the welding material: after the welding material is clamped and limited, activating the mixing head to perform a spot welding operation on the welding material until the welding is completed, and finally taking out the welding material subjected to the spot welding after the welding is finished.

* * * * *